United States Patent
Megiddo et al.

(10) Patent No.: US 8,505,026 B2
(45) Date of Patent: Aug. 6, 2013

(54) SERVICE ENABLEMENT BASED UPON MICROFORMATS

(75) Inventors: Eran Megiddo, Bellevue, WA (US);
Jensen M. Harris, Bellevue, WA (US);
Richard J. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1268 days.

(21) Appl. No.: 12/053,789

(22) Filed: Mar. 24, 2008

(65) Prior Publication Data

US 2009/0241137 A1 Sep. 24, 2009

(51) Int. Cl.
*G06F 13/00* (2006.01)

(52) U.S. Cl.
USPC .......................................... 719/311; 719/330

(58) Field of Classification Search
USPC .................................................. 719/311, 330
See application file for complete search history.

(56) References Cited

U.S. PATENT DOCUMENTS

| 7,783,967 B1 * | 8/2010 | Carnell et al. ................. 715/234 |
| 2008/0091800 A1 * | 4/2008 | Sorrentino et al. ........... 709/219 |
| 2009/0150262 A1 * | 6/2009 | Mizhen .......................... 705/27 |

* cited by examiner

*Primary Examiner* — Andy Ho
(74) *Attorney, Agent, or Firm* — Lee & Hayes, PLLC

(57) ABSTRACT

Computer applications commonly have various services that improve application functionality for a user. Different services can be applied to other sources, such as other applications, and users can perform functionality upon the other sources. This not only provides a user with greater options in using a source, but can also provide a user with a more familiar context when using the source.

19 Claims, 12 Drawing Sheets

| ITEM | SIZE | PRICE |
|---|---|---|
| WHITE TOWELS | 8 x 12 | $5.00 |
| COLORED TOWELS | 8 x 12 | $6.00 |
| EMBROIDERED TOWELS | 8 x 12 | $10.00 |
| LARGE WHITE TOWELS | 16 x 24 | $7.00 |
| LARGE COLORED TOWELS | 16 x 24 | $9.00 |

FIG. 7a

| CLICK TO SORT BY ITEM NAME 708 | CLICK TO SORT BY SIZE 708 | CLICK TO SORT BY PRICE 708 |
|---|---|---|
| ITEM | SIZE | PRICE |
| WHITE TOWELS | 8 x 12 | $5.00 |
| COLORED TOWELS | 8 x 12 | $6.00 |
| LARGE WHITE TOWELS | 8 x 12 | $7.00 |
| LARGE COLORED TOWELS | 16 x 24 | $9.00 |
| EMBROIDERED TOWELS | 16 x 24 | $10.00 |

FIG. 7b

| ITEM | SIZE | PRICE |
|---|---|---|
| WHITE TOWELS | 8 x 12 | £2.50 |
| COLORED TOWELS | 8 x 12 | £3.00 |
| EMBROIDERED TOWELS | 8 x 12 | £5.00 |
| LARGE WHITE TOWELS | 16 x 24 | £3.50 |
| LARGE COLORED TOWELS | 16 x 24 | £4.50 |

FIG. 7d

| QUEMADMODUM | FIGURA | LICEOR |
|---|---|---|
| ALBATUS SUDARIUM | 8 x 12 | $5.00 |
| INFUCATUS SUDARIUM | 8 x 12 | $6.00 |
| AULAEUM SUDARIUM | 8 x 12 | $10.00 |
| AMPLUS ALBATUS SUDARIUM | 16 x 24 | $7.00 |
| AMPLUS INFUCATUS SUDARIUM | 16 x 24 | $9.00 |

FIG. 7c

# SERVICE ENABLEMENT BASED UPON MICROFORMATS

TECHNICAL FIELD

The subject specification relates generally to computer applications and in particular to allowing an auxiliary source to use a service of a computer application.

BACKGROUND

Computers have become an important tool in different phases of society. Large networks can exist that allow different computers to communicate with one another. Utilization of computers can take place in a wide area of situations. Individuals can communicate with one another through text messaging between cellular telephones. Large corporate entities can transfer various properties (e.g., money, shares, etc.) electronically though computers interaction. In addition, people and organizations can use computers to store valuable information (e.g., financial records, family photographs, etc.) in different memory types (e.g., flash memory, random access memory, read-only memory, etc.)

Various user-friendly applications have been developed to allow individuals to perform important tasks through a computer. For instance, word processing applications allow users to compose documents without engaging in extensive application training. A document composed on a word processing application allows a user to work on the document with relative ease in multiple sessions and to create multiple copies of the document at different times.

Some applications are function specific and are beneficial for use in a particular context. A spreadsheet application typically arranges items in a series of rows and columns. Data can be entered according to a row and column to allow for enhanced organization. Applications can gravitate toward a particular use; a spreadsheet application can be a useful tool in performing accounting functions. To assist in a particular use, an application can be implemented with capabilities designed to enhance the particular user. Using the accounting example, entries in the spreadsheet can modify to include currency of various nations.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Various applications include features that assist a user in performing functions. For instance, when a user composes a document in a word processing application, a grammar checking feature enables the user create a crisper document. Conventionally, application features are limited to the application itself and are not expanded beyond the application. For instance, to perform a grammar check on text in an online browser, a user would need to copy the text from the browser, paste the text into the word processing application, perform the check, copy the checked text, and paste the checked text in the browser.

The subject innovation allows a remote location to use a service native to an application. A link is established between the remote location and application that allows the remote location to take advantage of the service. This not only allows a remote location to have increased functionality, but also allows a user to perform operations in a more native atmosphere. In an illustrative example, if a user commonly exploits a sort feature of an application on their computer, then the user is likely to have improved performance if another application (e.g., an application at the remote location) uses the same context of the sort feature.

Microformats can be situated upon the remote location that can be utilized in establishing the link. The link can be created through the microformats (e.g., text on the web browser) and the user can perform actions related to the service directly upon the web browser. This goes against market trends, which attempt to create applications with more and more internal features. Using remote services can appear illogical since different users can have different features available and a common goal can be uniformity. However, using different features allows a user to have an experience that is likely more familiar and therefore likely more productive.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

BRIEF DESCRIPTION OF THE DRAWINGS

FIG. 7a illustrates a representative presentation of a table in accordance with an aspect of the subject specification.

FIG. 7b illustrates a representative presentation of a table integrated with a sort service in accordance with an aspect of the subject specification.

FIG. 7c illustrates a representative presentation of a table integrated with a translation service in accordance with an aspect of the subject specification.

FIG. 7d illustrates a representative presentation of a table integrated with a microformat in accordance with an aspect of the subject specification.

DETAILED DESCRIPTION

Figure 1:
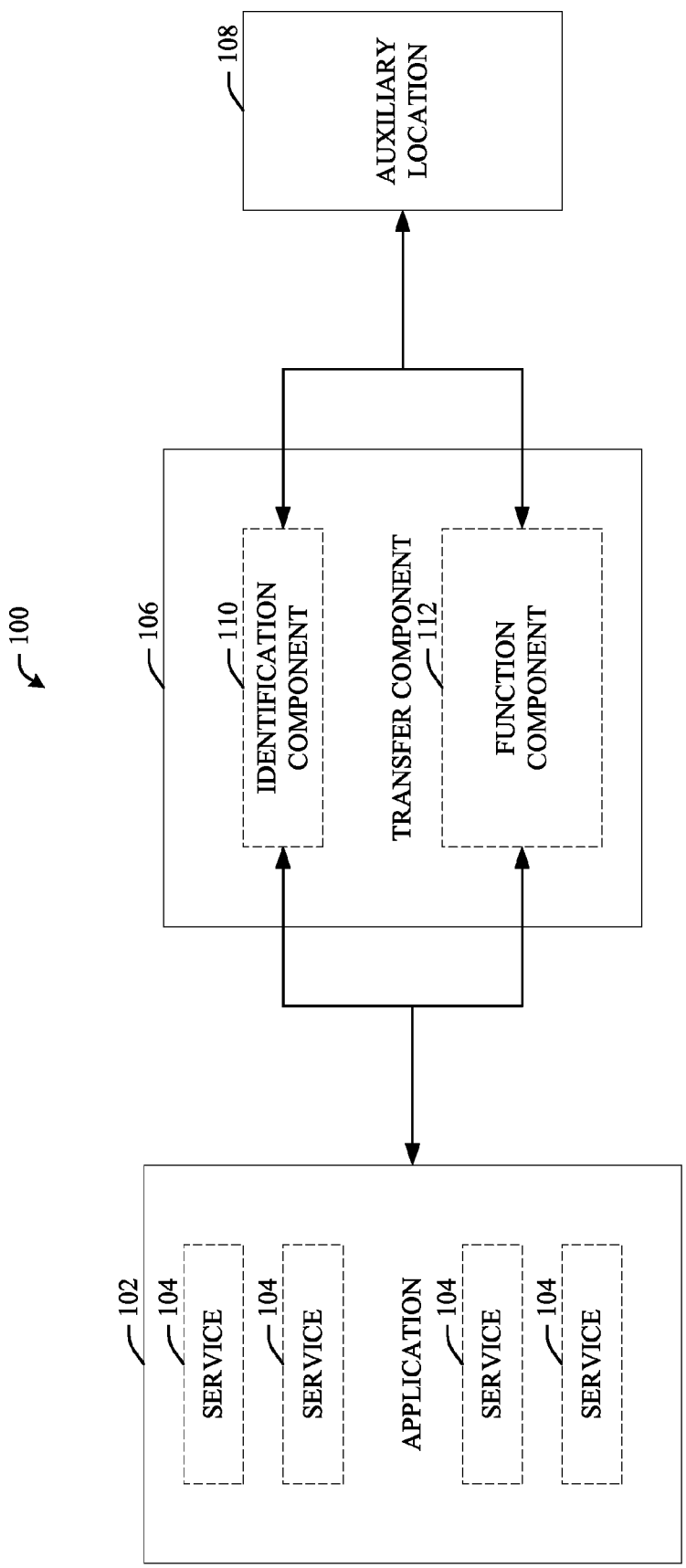
FIG. 1 illustrates a representative services application system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components. While some components are disclosed as being within other components, it is to be appreciated that various components can be extracted to operate independently with disclosed functionality unless otherwise disclosed. For instance, a storage component disclosed being within a computer component can configure to operate as an independent storage component outside of the computer component.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 1 is an example service appliance system 100. An application 102 typically operates on a computer configuration (e.g., processor, storage, etc.) and performs at least one specific task. For instance, a user can run a word-processing application as part of the system 100 in order to create a document. It is to be appreciated that the application 102 can operate independent of a user (e.g., the application 102 can be a database consistency check application that runs automatically at times designated by artificial intelligence.)

A common application 102 can include a variety of different services 104 that enable various tasks to be performed in context of the application 102. A non-exhaustive list of possible services 104 in an application 102 include spellchecking, sorting, filtering, annotating, providing a tool (e.g., wizard), etc. Services 104 exist according to a number of different configurations. For example, services can be used in one portion of an application, but not to another (e.g., spellchecking can be available in a 'write' mode, but not in a 'read-only' mode.)

A transfer component 106 allows services from the application 102 to be integrated to an auxiliary location 108 (e.g., a secondary application on a computer operating the application 102.) Integration of the services is a unique approach that goes against general trends. Conventional development has been to apply full applications to auxiliary locations (e.g., an online browser.) However, the subject innovation allows for individual services 104 to be used with the auxiliary location 108 that can save various complementary resources, such as storage (e.g., an auxiliary location with a few integrated remote services likely occupies less memory then an auxiliary location that includes a large number of services.)

The transfer component 106 can include an identification component 110. The identification component 110 can perform a number of different detection procedures relating to the system 100. The application 102 can send a notification to the transfer component 106 of available services. The identification component 110 determines what the services 104 are and concludes various capabilities of the services 104. In addition, the identification component 110 can actively search the application to determine services 104. Logic can regulate operation of the identification component 110. The identification component 110 can operate as a means for identifying a feature, a destination, or both.

Moreover, the identification component 110 can detect various properties that relate to the auxiliary location 106. According to one embodiment, the identification component 110 determines raw characteristics of the auxiliary location 108. For example, an investigation of the auxiliary location 108 can provide information such as if the auxiliary location 108 has security measures that should be overcome prior to application of a service 104 (e.g., raw characteristics is that there is security measures while non-raw characteristics are what security measures are in place.) The identification component 110 can also perform evaluations upon the auxiliary location 108 (e.g., determine non-raw characteristics.) Results of evaluations performed by the identification component 110 can transfer to a function component 112.

The function component 112 can be part of the transfer component 106 and incorporating at least one service 104 of the application 102 to the auxiliary location 108. Incorporating the service 104 allows for functionality of the service 104 to extend beyond application context. Incorporation can take form through a number of different embodiments, including writing code in language of auxiliary source 108 accessing the service 104, generating a layer between auxiliary source 108 and service 108 that allows for interaction, etc. The function component 112 can operate as a means for associating the feature with the destination, where association allows the destination to exploit at least one characteristic of the feature.

As an illustrative example, the system 100 can implement a spellchecking service 104 of the application 102 upon an online browser that serves as the auxiliary source 108. The identification component 110 can receive a message from the application 102 stating what is shown on the online browser should be spellchecked (e.g., a message originates from a user engaging the application 102 and auxiliary location 108.) The identification component 110 locates a spellchecking service 104 upon the application 102 (e.g., finds code that operates the service) and relevant portions of the online browser. The function component 112 takes details found by the identification component 110 and creates a layer that allows the functionality of spellchecking to engage upon the online browser.

Figure 2:
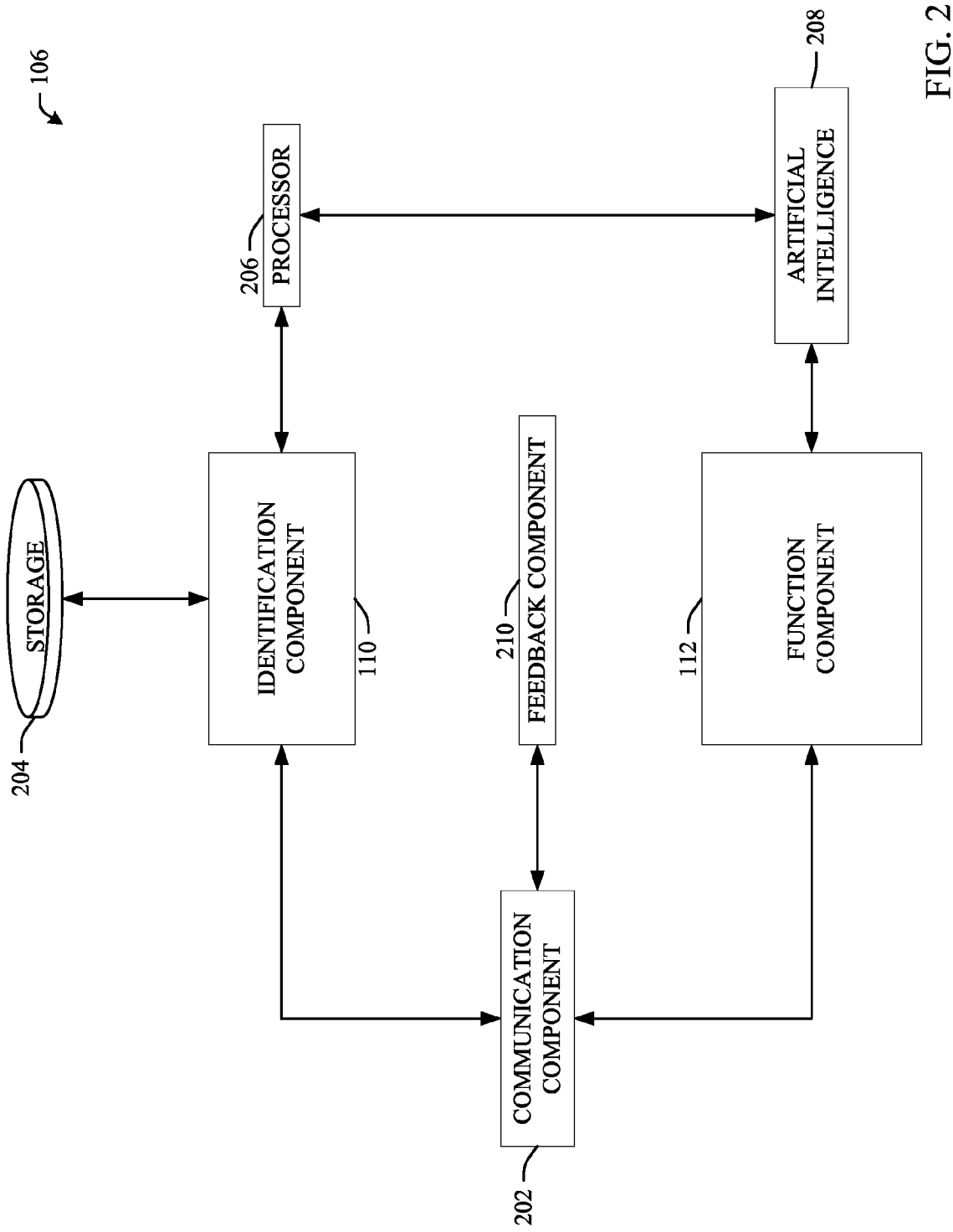
FIG. 2 illustrates a representative transfer component in accordance with an aspect of the subject specification.

FIG. 2 discloses various components that can be included in the transfer component 106. A communication component 202 allows the function component 106 to interact with various other devices, including devices disclosed in system 100 of FIG. 1. The communication component 202 can operate in a wireless manner, through a hard wire configuration, etc.

An identification component 110 finds information that relates to an application 102 of FIG. 1 (e.g., service source) and/or an auxiliary location 108 of FIG. 1. The identification component 110 can engage storage 204 for various purposes. According to one embodiment, a position of an auxiliary location 108 of FIG. 1 can be saved in storage 204. If the identification component 110 is assigned to work with the auxiliary location 108 of FIG. 1 in a subsequent instance, then the position can be retrieved from storage 204. This can save system resources since a full search is not performed to find the position of the auxiliary location 108 of FIG. 1. Storage 204 can hold at least one data record and can utilize flash memory, read-only memory, random access memory, etc.

Identified information can travel to a processor 206. The processor 206 enables at least one result of the identification component 110 to be managed by other components of the system 100 of FIG. 1. For instance, a message can be received by the communication component 202 that an auxiliary location 108 of FIG. 1 is to have a spell check service implemented. The identification component 110 can find five different spell check services (e.g., an English version, French version, Italian version, Greek version, and Polish version.) The processor 206 analyzes a request received by the communication component 202 and select which spell check service to have applied to the auxiliary location 108 of FIG. 1 (e.g., received request can include language information.)

Artificial intelligence 208 makes at least one inference or at least one determination or at least one of each in relation to enablement of the auxiliary location 108 of FIG. 1 to utilize the service 104 of FIG. 1. Various scenarios can occur that are processed by the artificial intelligence 208. For example, the artificial intelligence 208 can receive information that relates to an auxiliary location 108 of FIG. 1. A determination can be made if a location is capable of receiving integration with a service. The artificial intelligence 208 can also be adaptive (e.g., in a manner similar to adaptation of the artificial neuron network.) and thus change as conditions are learned that related to operation of the system 100 of FIG. 1.

Artificial intelligence 208 can employ one of numerous methodologies for learning from data and then drawing inferences and/or creating making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems. Various components of the system 100 of FIG. 1 can utilize the artificial intelligence 208 in operation. For instance, the identification component 110 can modify how requests are analyzed based on an instruction from the artificial intelligence 208.

A function component 112 applies at least one service 104 of FIG. 1 to the auxiliary location 108 of FIG. 1. The function component 112 can utilize the communication component to engage the service 104 of FIG. 1 and/or the auxiliary source 108 of FIG. 1. A feedback component 210 can perform various tests concerning a service 104 of FIG. 1 integrating with an auxiliary location 108 of FIG. 1. For example, various errors in integration can be discovered by the feedback component 210. The feedback component 210 can transfer a message disclosing errors to artificial intelligence 208. Artificial intelligence 208 can adaptively learn that taking certain actions can result in errors. Knowledge gained by the artificial intelligence 208 can be used by the function component 112 when creating future integrations.

Figure 3:
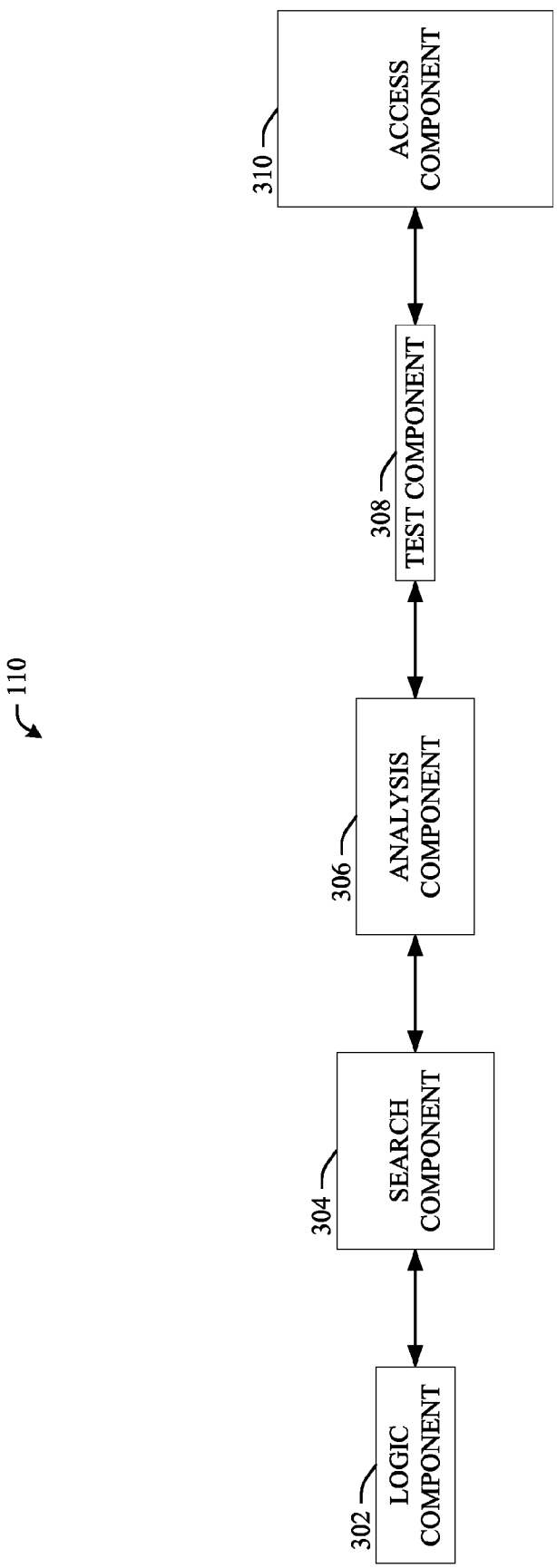
FIG. 3 illustrates a representative identification component in accordance with an aspect of the subject specification.

FIG. 3 discloses an example identification component 110 integrated with various units to assist in operation. A request to integrate an auxiliary location 108 of FIG. 1 with a service 104 of FIG. 1 can originate from various locations (e.g., a third party device) and be transmitted to the identification component 110. A logic component 302 can identify a source of a request (e.g., application 102 of FIG. 1, auxiliary location 108 of FIG. 1, etc.) In addition, the logic component 302 can determine if a request is authorized (e.g., according to parameters, is the system 100 of FIG. 1 allows to enable an auxiliary location 108 of FIG. 1 with a service 104 of FIG. 1.)

Based on output of the logic component 302 (e.g., a source of a request.), a search component 304 can gather information that relates to application of a service 104 of FIG. 1. In an instance where a request originates from an application 102 of FIG. 1, the search component 304 can learn an Internet Protocol address of a unit that is intended to integrate with the service. If a request originates from an auxiliary location 108 of FIG. 1, then the search component 304 can attempt to locate a service 104 of FIG. 1 upon the application 102 of FIG. 1 and/or find an application 102 that includes a desired service. For instance, the search component 304 can determine (e.g., through artificial intelligence techniques) that a spell-check service should be provided and locate a spell-checker. However, it is also possible for a user to request the spell-check service explicitly.

An analysis component 306 can perform evaluations upon results produced by the search component 306. When creating integration between a service 104 of FIG. 1 and an auxiliary location 108 of FIG. 1, various amounts of information can be beneficial in creating the integration. For instance, relative size of the service 104 of FIG. 1 and the auxiliary location 108 of FIG. 1 can influence how a link is created and an amount of resources that should be dedicated to creation of the link. Moreover, the analysis component 306 can determine an amount of resource that will be consumed while a link is in use. The analysis component 306 can gain criteria for evaluations from storage 204 of FIG. 2, through learning conducted by artificial intelligence 208 of FIG. 2, etc.

A test component 308 can perform tentative verifications upon the service 104 of FIG. 1 and/or auxiliary location 108 of FIG. 1. There is a possibility that a service and auxiliary location are incompatible. Since it can be resource intensive to operate the system 100 of FIG. 1 in entirety, a test prior to operation of the function component 112 of FIG. 1 can allow resources to be saved if integration cannot be created. Rationale for the test can be derived from the logic component 302, storage 204 of FIG. 2, artificial intelligence 208 of FIG. 2, etc.

An access component 310 can execute actions upon the storage 204 of FIG. 2. Example actions are a read, write, transfer, copy, paste, compress, de-compress, etc. Since various components of system 100 of FIG. 1 can utilize storage 208 of FIG. 2, the access component 310 allows utilization to be performed in an organized manner. According to one embodiment, the storage 204 of FIG. 2 is in a remote location (e.g., not included in the transfer component 106) and the access component 110 corresponds with storage 204 of FIG. 2 wirelessly through use of the communication component 202 of FIG. 2.

Figure 4:
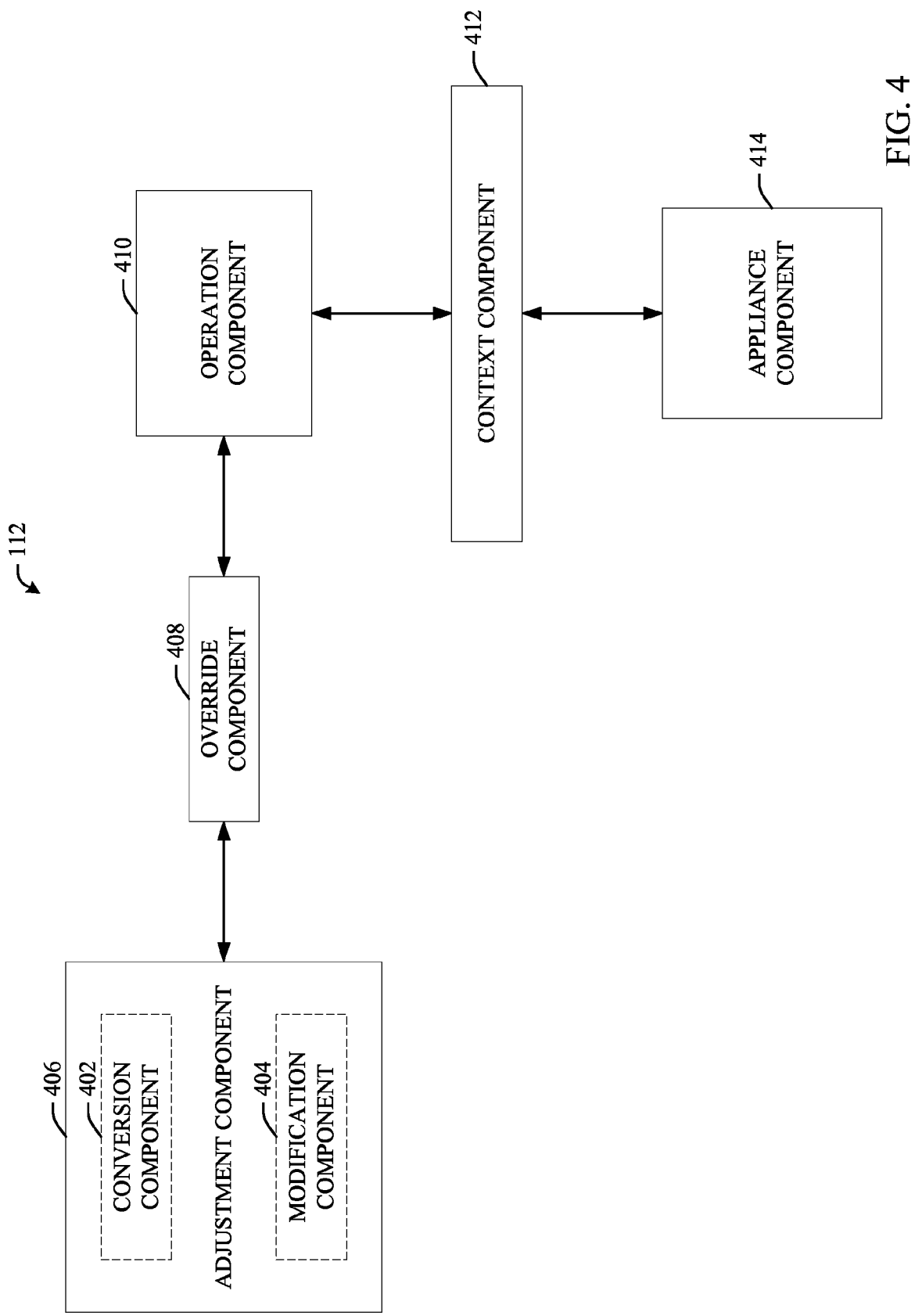
FIG. 4 illustrates a representative function component in accordance with an aspect of the subject specification.

FIG. 4 discloses an example function component 112. Commonly, a service source (e.g., application 102 of FIG. 1) and service 104 of FIG. 1 use a programming language to operate (e.g., follow instructions, pass information, etc.) There is a relatively high probability that an auxiliary location 108 of FIG. 1 operates in a language different then the service source. A conversion component 402 can perform an alteration in order to allow the service 104 of FIG. 1 to work with the auxiliary source 108 of FIG. 1. The conversion component 402 can operate according to a number of different embodiments. New code can be written that bridges the service 104 of FIG. 1 with the auxiliary source 108 of FIG. 1. However, the service 104 of FIG. 1 can be copied locally (e.g., a copy saved in storage 204 of FIG. 2) and be altered to engage the auxiliary location 108 of FIG. 1. Furthermore, the conversion component 402 can practice other configurations to achieve desired functionality (e.g., changing the service 104 of FIG. 1.)

The conversion component 402 can operate in conjunction with a modification component 404. The modification component 404 prepares the auxiliary location 108 of FIG. 1 for integration. For example, the modification component 404 can make changes to the auxiliary location 108 of FIG. 1 so the service 104 of FIG. 1 can be used with relatively few errors. The conversion component 402 and modification component 404 can integrate together to form an adjustment component 406 that prepares a source, an auxiliary location, or both for integration of a service with an auxiliary location.

The auxiliary location 108 of FIG. 1 can already have functionality similar to the service 104 of FIG. 1. Nonetheless, it can be desirable that functionality of the service 104 of FIG. 1 be placed over the functionality in the auxiliary location 108 of FIG. 1. For example, the auxiliary location 108 of FIG. 1 can include a spell checking capability. However, spell checking of the auxiliary location 108 of FIG. 1 can be of British English while a user desires to have a document reviewed according to American English, which is not supported by the auxiliary location 108 of FIG. 1.

An override component 408 can replace native functionality of the auxiliary location 108 of FIG. 1 with functionality of the service 104 of FIG. 1. The override component 408 can have a suppression algorithm that represses functionality of the auxiliary location 108 of FIG. 1. Once repressed, the service 104 of FIG. 1 can be implemented upon the auxiliary location 108 of FIG. 1 through the override component 408.

The function component 112 can include an operation component 410 that at least partially performs procedures of the auxiliary location 108 of FIG. 1. When an override component 408 suppresses an action of the auxiliary location 108 of FIG. 1, it is possible that a procedure of the auxiliary location 108 of FIG. 1 is impacted (e.g., a procedure does not work correctly, a procedure does not operate, etc.) The operation component 410 can take over related procedures and run the related procedures of the auxiliary location 108 of FIG. 1. Assuring that procedures can run increases a likelihood that the auxiliary location 108 of FIG. 1 functions fluidly with an integrated service 104 of FIG. 1.

Various microformats can be utilized in an auxiliary location 108 of FIG. 1. A microformat is a unit that allows the auxiliary location 108 of FIG. 1 (e.g., an online browser) to associate data with an action. A context component 412 allows microformats to be utilized through the function component 112 in enabling a service 104 of FIG. 1 to integrate with the auxiliary location 108 of FIG. 1. The context component 412 can identify at least one microformat in an auxiliary location 108 of FIG. 1 and transfer results of the identification to another device.

An appliance component 414 enables an auxiliary location 108 of FIG. 1 to utilize at least one remote service. Typically, this is done through integration of the service 104 of FIG. 1 with the auxiliary location 108 of FIG. 1. Integration commonly includes creating a temporary link between two units to there can be successful interaction; however, it is possible that the link be relatively permanent (e.g., created with the intent of not being disconnected.) The appliance component 414 can enable the auxiliary location 108 of FIG. 1 to utilize at least one service 104 of FIG. 1 through association of the service 104 of FIG. 1 with at least one microformat of the auxiliary location 108 of FIG. 1. According to one embodiment, the context component 412 identifies disparate data of the auxiliary location 108 of FIG. 1. The appliance component 414 associates an identified microformat with a service 104 of FIG. 1 (e.g., tool) of an application 102.

Figure 5:
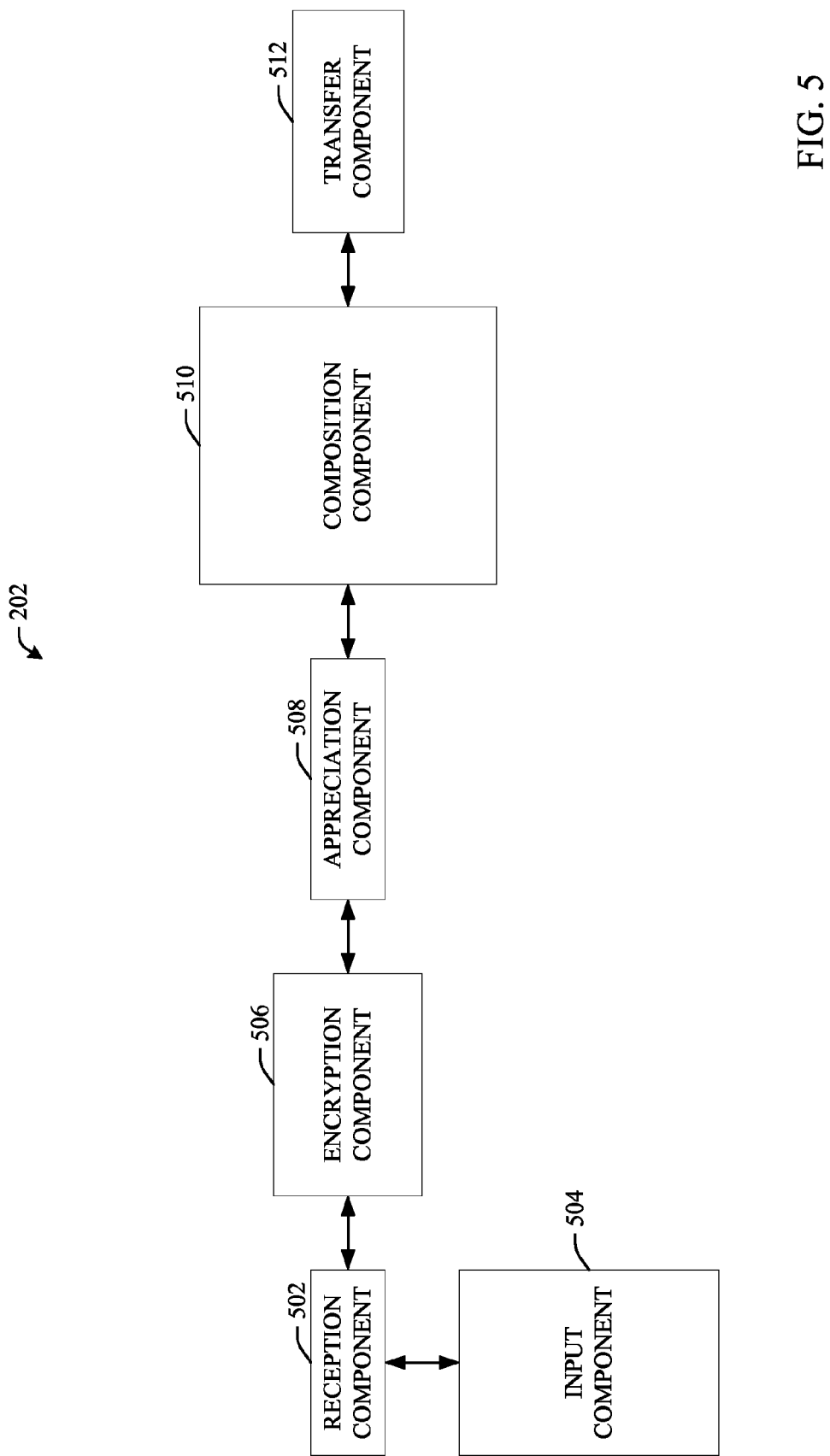
FIG. 5 illustrates a representative communication component in accordance with an aspect of the subject specification.

FIG. 5 discloses an example communication component 202. A reception component 502 gains at least on piece of information. Various amounts of data can enter into the communication component 202 and the reception component can collect the data. The reception component 502 receives a request to enable an auxiliary location 108 of FIG. 1 to utilize a remote service 104 of FIG. 1. The reception component 502 can utilize an input component 504 that can be engaged by a user. The user can directly enter information into the communication component 202 through the input component 504. For instance, the user can place a request to integrate at least one service 104 of FIG. 1 with an auxiliary location 108 of FIG. 1.

The communication component 202 can handle information that has various amounts of security measures. An encryption component 506 can perform at least one security action upon received information; this can include both encrypting information as well as decrypting information. In an illustrative example, a received request for integration can be sent in an encrypted manner. The encryption component 508 accesses storage 204 of FIG. 2 to learn how to decrypt information and then decrypts the request so other units of the system 100 of FIG. 1 can use the request.

Received information commonly moves to other devices of the transfer component 106 of FIG. 1 as well as the system 100 of FIG. 1. It can be beneficial to provide metadata (e.g., name of a request sender) that relates to received information to other devices. The appreciation component 508 can perform analysis upon received information to determine metadata of the information. Moreover, the appreciation component 508 can use appreciated metadata to determine a device in which to relocate a piece of received information.

Commonly, in addition to corresponding information, the communication component 202 sends messages related to the information. For instance, when a request is received, a confirmation can be emitted to the sender that the request was successfully received. A composition component 510 can create a message that is moved to another unit. A created message can be formal (e.g., a notice that can be appreciated by a user), a signal (e.g., a temporary high state transferred to a third party unit, such as a database.), etc. A transfer component 512 can emit information that relates to the function component 106 of FIG. 1. Examples of information that can be emitted by the transfer component 512 are metadata, composed messages, received information, etc.

Figure 6:
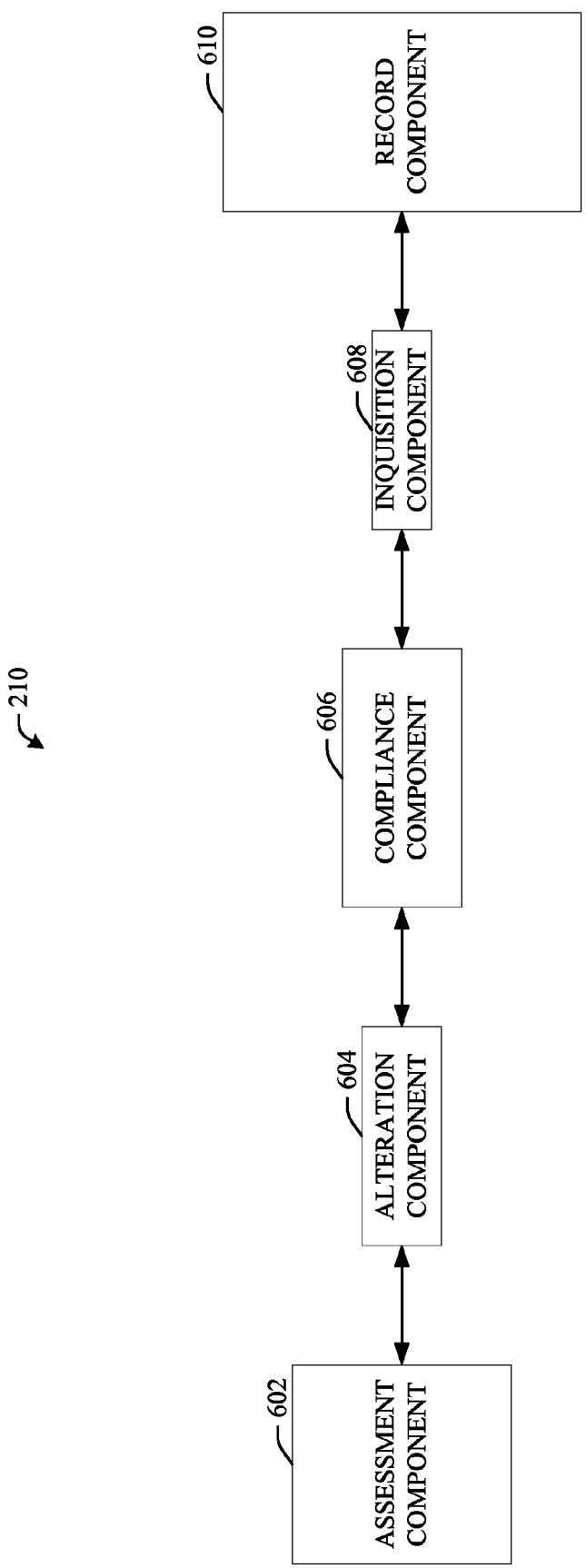
FIG. 6 illustrates a representative feedback component in accordance with an aspect of the subject specification.

FIG. 6 discloses an example feedback component 210 that performs at least one test to determine operation of integration. An assessment component 602 can be used to continuously check integration and determine if integration is operating as expected. For example, when a user engages a graphical user interface object (e.g., a button that states 'sort by name') a failure error can occur. The assessment component 602 can be used identify the error.

An alteration component 604 can resolve how to correct an error determined by the assessment component 602. Various other components can be utilized to resolve how to correct the error (e.g., storage 204 of FIG. 2, artificial intelligence 208 of FIG. 2, etc.) The alteration component 604 can transfer a suggested change to the function component 112 for implementation.

A compliance component 606 can establish if a service 104 of FIG. 1 is operating as intended with regard to the auxiliary location 108 of FIG. 1. When a request to enable an auxiliary location 108 of FIG. 1 to utilize a service 104 of FIG. 1 is received, there can be parameters that are to be followed. For instance, a request can come from a user asking that alphabetical sort be available. In implementation, alphabetical sort can work in a unidirectional manner (e.g., can sort A-Z, but not Z-A.) This can go against what is desired by the user and the compliance component 606 can establish that an intention is not met.

An inquisition component 608 can ask an operator (e.g., a user, a requesting machine, etc.) their response to a created link. In an illustrative example, a questionnaire can be presented to a user asking inquiries that relate to the link. Example inquiries include 'was performance of a feature adequate', 'did a feature function as you expected', 'would you like to create a record of this engagement so the feature can be used with this application again', etc.

A record component 610 can access storage 204 of FIG. 2 and make a documentation that concerns discoveries made by other units of the feedback component 210. The record component 610 can include selective logic that determines when a record should be made and what the contents of the record should be so there is not an overflow of information saved in storage 208 of FIG. 2. Other components of the system 100 of FIG. 1 can utilize documentation created by the record component 610 in their functioning. For instance, the artificial intelligence 208 of FIG. 2 can access documentation created by the feedback component 210 and use the documentation to alter operation of the function component 112 of FIG. 1 (e.g., if feedback from a link was negative, then algorithms used to create a link can be altered so a more efficient link is created in a future instance.)

FIGS. 7a to 7d disclose a table 700 in different configurations. A monitor of a computer displays the table 700 that is accessed through an online browser. FIG. 7a discloses an example presentation of the table 700 that is not enabled to use a remote service. The table 700 shown in FIG. 7a is a base table that is used by other configurations. In an illustrative instance, three columns are shown in the table 700: an item column 702, a size column 704, and a price column 706.

FIG. 7b discloses an example presentation of the table 700 that is enabled to use a sort service. A user can have a spreadsheet application on his/her computer that discloses the table 700. The spreadsheet includes a sort function (e.g., service) that can link with the code that creates the table. The link enables the table to be operated as if it were located in the spreadsheet application. The spreadsheet application does not need to be open/active in order for the service to operate. The columns 702-706 can integrate with sort tabs 708 that enable the user to organize rows of the table 700 based on values in the columns 702-706.

FIG. 7c discloses an example presentation of the table 700 that is enabled to use a language service. A link can be established with a service that modifies a language of disclosed information. Information in the columns 702-706 can be evaluated if there is language-supported text and based on a result of the evaluation, at least some of the information can be translated. In an example embodiment, the evaluation can be performed by the analysis component 306 of FIG. 1.

FIG. 7d discloses an example presentation of the table 700 that is enabled to use an exchange service. An exchange service (e.g., currency alteration service) can change a price into terms of a local currency. For instance, the search component 304 can determine the online browser supports a company in the United States, but a user viewing the browser is in Wales. Based on the determination, a conversion of information in the price column 706 can be modified to the local price while the other columns 702 and 704 can remain the same.

Figure 8:
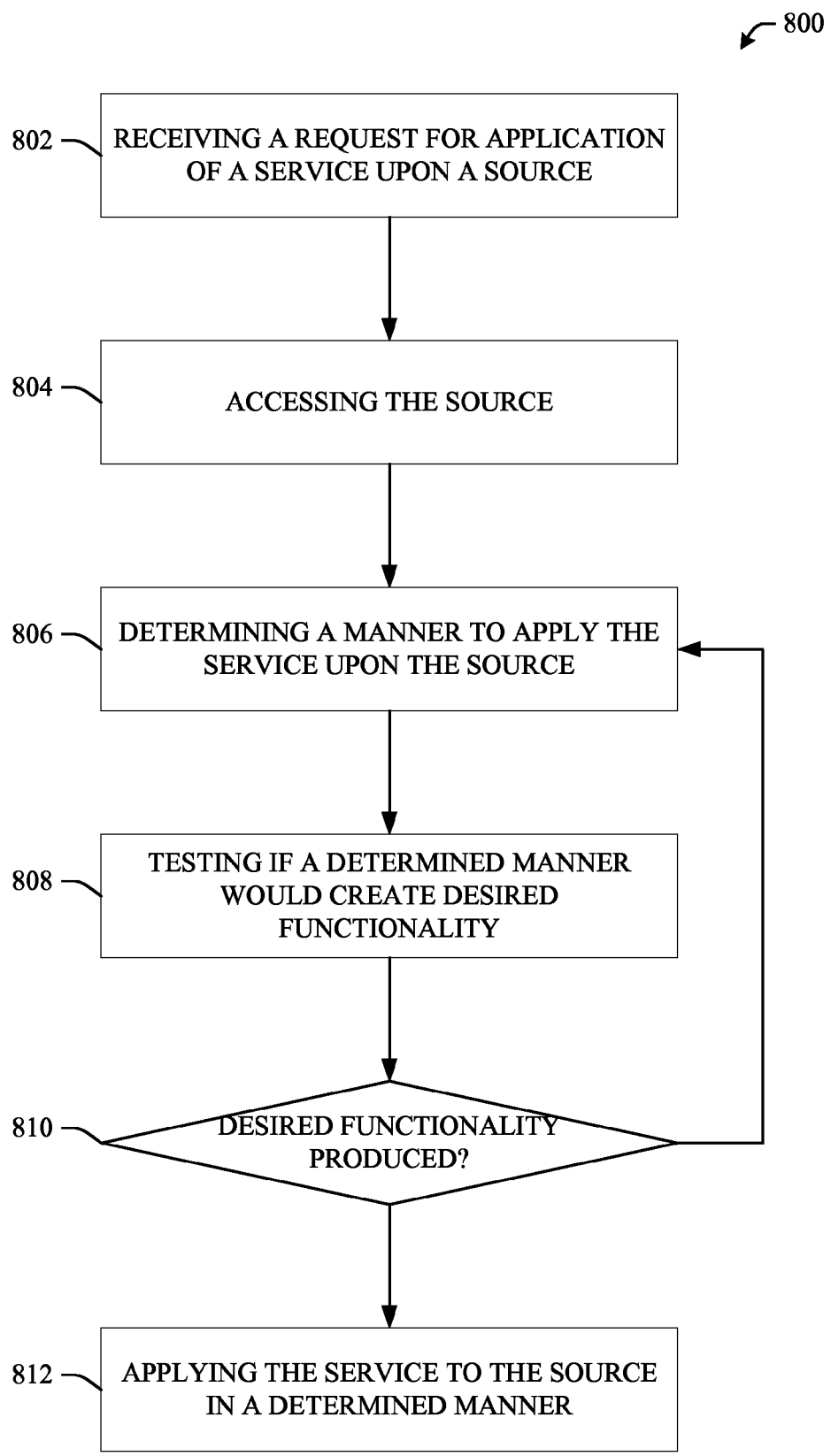
FIG. 8 illustrates a service application methodology in accordance with an aspect of the subject specification.

FIG. 8 discloses an example methodology 800 for service application upon an auxiliary locality. There is receiving a request for application of a service upon a source 802. A request can be received in a number of different manners. For instance, a user can explicitly request that a service be applied upon a source. However, a source can perform a search upon a user's computer to determine a service that it can use for the source's benefit and this request can be sent and received.

Act 804 is accessing the source. Commonly, accessing the source 804 includes creating conductivity between a system implementing the methodology 800 and the source so communication can take place. Moreover, accessing the source allows for various amounts of information that concern the source to be ascertained.

Determining a manner to apply the service upon the source occurs 806. A service can be applied in a number of different manners. For instance, new code can be created that allows the source to utilize different aspects of the service. Various evaluations can take place to establish that a manner is appropriate. For instance, previous history can be accessed to determine if writing new code has been an appropriate way to apply the service in the past.

There is testing if a determined manner would create desired functionality 808. Commonly, a diagnostics test can be used to make an evaluation if a manner will allow a service and source to operate as desired. Check 810 determines if desired functionality was produced. If desired functionality was not produced, then the methodology 800 returns to event 806. At event 806, a new manner can be selected and retesting and determinations can occur. If desired functionality was produced, then the methodology 800 can continue. Desired functionality can be ascertained though use of stored criteria.

Applying the service to the source in a determined manner 812 occurs. Since there is a relatively high likelihood that desired functionality will be achieved (e.g., determined through actions 806, 808, and 810), the determined manner can be used. For example, if the determined manner was to write new code to bridge a source and service together, then the code is written.

Figure 9:
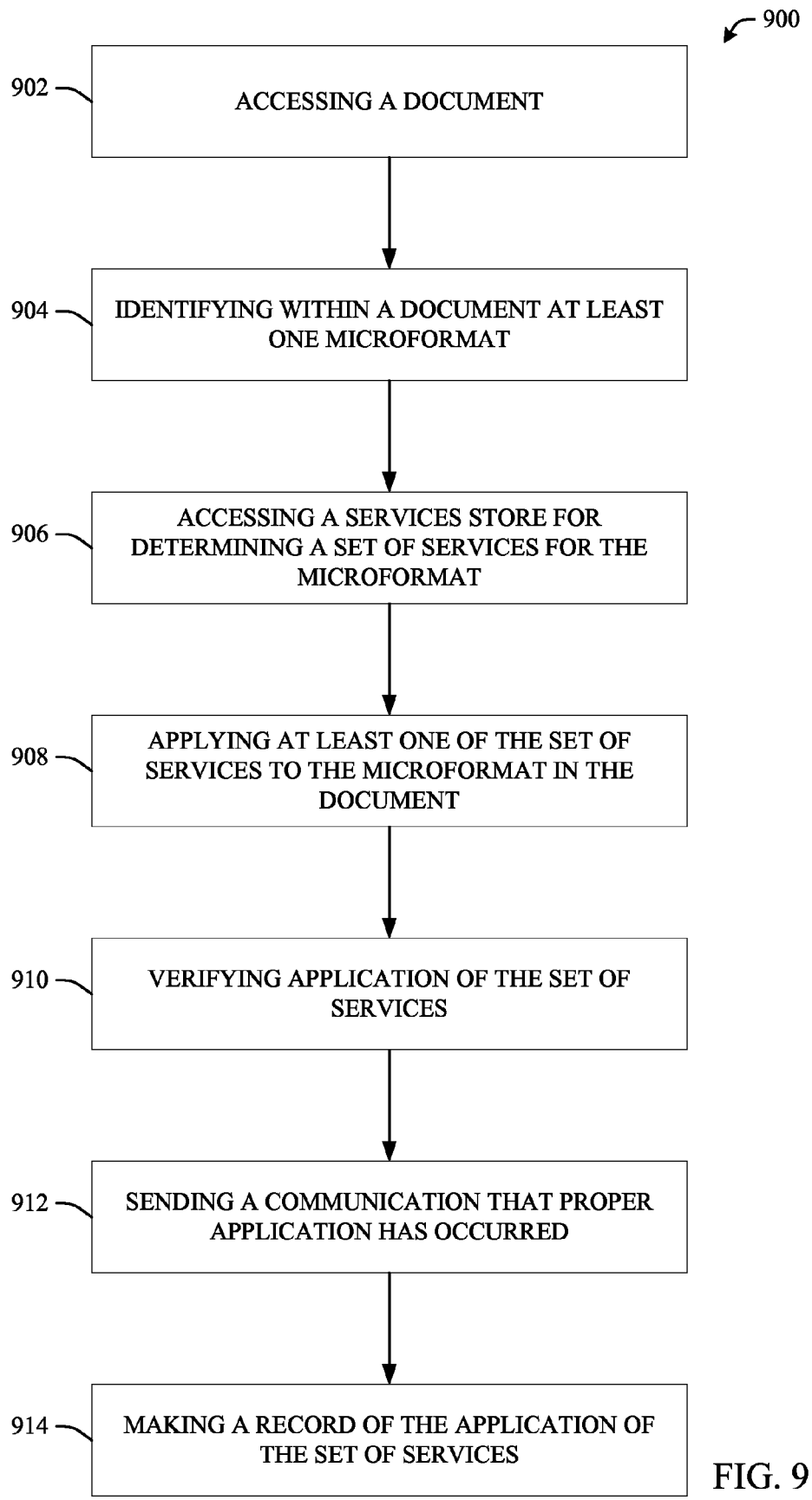
FIG. 9 illustrates a representative microformat methodology in accordance with an aspect of the subject specification.

FIG. 9 discloses an example microformat service integration methodology 900. Event 902 is accessing a document (e.g. accessing a document from a remote location.) A document is an item that includes at least on piece of information (e.g., a computer file.) Typically, documents are saved on internal storage of a system. Accessing a single document commonly includes maneuvering through a storage device to allow other devices to gain a right to use to the document.

There is identifying within a document at least one microformat 904. According to one embodiment, identification can take place through a detailed analysis of the document. Commonly a search is performed to identify a particular type of microformat; a microformat that can be used to create a link enabling a service to used by the document.

Accessing a services store for determining a set of services for the microformat 906 occurs. Commonly, services for an application are saved in memory of a computer. A read can take place in order to appreciate what services are available. In addition, there is analysis of the services so one can be selected for application with the accessed document.

Applying at least one of the set of services to the microformat in the document 908 takes place. Application enables the document to use the set of services that are applied. Application can take a number of different configurations. Computer code can be written that enables use of the services by the document. In addition, the document and/or set of services can actively adapt to one another so they can function concurrently.

There can be verifying application of the set of services 910. When an application of a set of services takes place, various errors can arise and these errors can be appreciated through verification. Commonly, information is available so a determination can be made as to how a document integrated with the set of services is expected to operate. Based on the expectancy, event 910 can determine that the application took place and a quality level of the application.

Action 912 is sending a communication that proper application has occurred. Commonly, this event takes place if the verification found that the application took place within a set standard. For instance, if through operation of the set of services with the document took place without error for ten hours, then verification can determine application was proper. A message can be transmitted stating that application was proper (e.g., successful.); according to one embodiment, the message is transmitted to a storage location.

Act 914 is making a record of the application of the set of services. Example contents of a record include statistical information (e.g., time, place, etc.), what was applied, if there were errors, etc. Applying a record allows various determinations to be created concerning a quality of an application. Modifications to specific algorithms used by the methodology 900 can take place based on the record.

Figure 10:
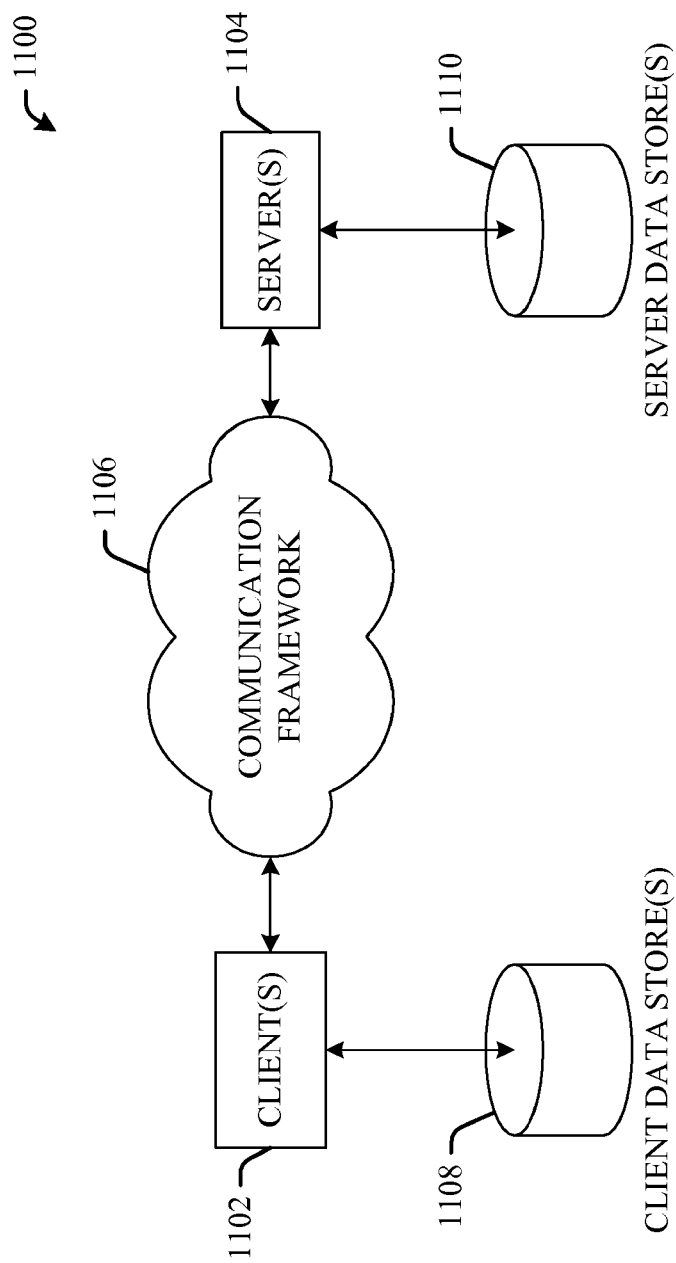
FIG. 10 illustrates an example of a schematic block diagram of a computing environment in accordance with the subject specification.
Figure 11:
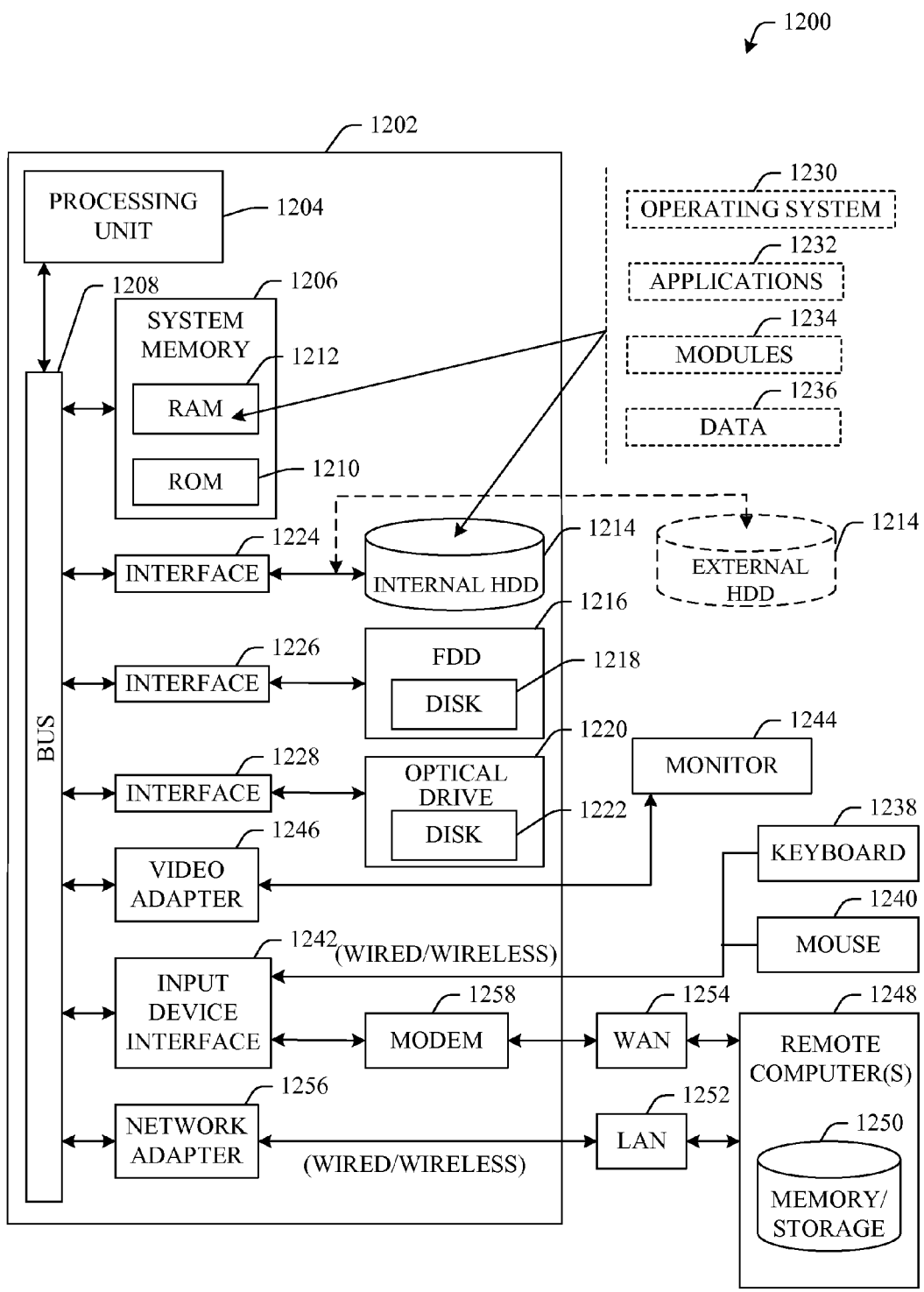
FIG. 11 illustrates an example of a block diagram of a computer operable to execute the disclosed architecture.

In order to provide a context for the various aspects of the disclosed subject matter, FIGS. 10 and 11 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the present specification. It is, of course, not possible to describe every conceivable combination of components or methodologies for purposes of describing the present specification, but one of ordinary skill in the art can recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors;
   memory coupled to the one or more processors;
   a reception component, stored in the memory and executable on the one or more processors, that receives a request to enable an auxiliary location to integrate at least one remote service performed by a remote application with the auxiliary location;
   a context component that identifies at least one microformat of the auxiliary location; and
   an appliance component that enables the auxiliary location to integrate the at least one remote service performed by the remote application through association of the remote service with the at least one identified microformat of the auxiliary location.

2. The system of claim 1, further comprising an adjustment component, stored in the memory and executable on the one or more processors, that prepares the auxiliary location, the at least one remote service, or both for enablement of the auxiliary location to integrate the at least one remote service.

3. The system of claim 1, further comprising artificial intelligence that makes at least one inference or at least one determination in relation to enablement of the auxiliary location to integrate the at least one remote service.

4. The system of claim 1, further comprising a feedback component, stored in the memory and executable on the one or more processors, that obtains reaction information of enablement of the auxiliary location to integrate the at least one remote service.

5. The system of claim 1, further comprising a search component, stored in the memory and executable on the one or more processors, that automatically gathers at least one piece of information that relates to the at least one remote service or to the auxiliary location, the at least one piece of gathered information is used by the appliance component to enable the auxiliary location to integrate the at least one remote service.

6. The system of claim 1, further comprising an analysis component that evaluates at least one piece of information that relates the at least one remote service, the auxiliary location, at least one evaluation result is used by the appliance component to enable the auxiliary location to integrate the at least one remote service.

7. The system of claim 1, further comprising a test component, stored in the memory and executable on the one or more processors, that checks if enablement of the auxiliary location to integrate the at least one remote service is likely to be performed successfully.

8. The system of claim 1, further comprising storage that retains at least one record that relates to enablement of the auxiliary location to integrate the at least one remote service.

9. The system of claim 1, further comprising an override component, stored in the memory and executable on the one or more processors, including a suppression algorithm that suppresses a local service of the auxiliary location so the auxiliary location can integrate the at least one remote service.

10. A method for applying at least one service based upon at least one microformat, comprising:
- accessing a local service store for determining a set of services associated with a microformat in a document stored at a remote location;
- applying at least one of the set of services to the microformat in the document stored at the remote location; and
- verifying application of the at least one of the set of services to the microformat in the document stored at the remote location.

11. The method of claim 10, further comprising identifying within the document the microformat.

12. The method of claim 11, further comprising accessing the document stored at the remote location.

13. The method of claim 10, further comprising sending a communication that includes application verification result.

14. The method of claim 10, further comprising making a record of application of a set of services.

15. One or more computer-readable storage devices storing computer-executable instructions that, when executed, cause one or more processors to perform acts comprising:
- accessing a document from a remote location;
- identifying within the document at least one microformat;
- accessing a service store for determining a set of services for the at least one microformat within the document from the remote location; and
- applying at least one of the set of services to the at least one microformat in the document.

16. The one or more computer-readable storage devices of claim 15, further comprising:
- verifying application of the set of services to the at least one microformat in the document;
- at least partly based on the verifying, sending a communication that proper application of the set of services has occurred; and
- recording the proper application of the set of services.

17. The one or more computer-readable storage devices of claim 16, wherein the recording comprises recording statistical information, the set of services applied, and application errors.

18. The one or more computer-readable storage devices of claim 15, wherein identifying the at least one microformat, identifies a type of microformat that can be used to create a link enabling a service to be used by the document.

19. The one or more computer-readable storage devices of claim 15, wherein the document comprises an item that includes at least one piece of information and wherein accessing the document further comprises allowing other devices to gain a right to use the document.

* * * * *